(12) United States Patent
Davydov et al.

(10) Patent No.: US 11,930,522 B2
(45) Date of Patent: *Mar. 12, 2024

(54) REDUCED CSI (CHANNEL STATE INFORMATION)-RS (REFERENCE SIGNAL) DENSITY SUPPORT FOR FD (FULL DIMENSIONAL)-MIMO (MULTIPLE INPUT MULTIPLE OUTPUT) SYSTEMS

(71) Applicant: Apple Inc., Cupertino, CA (US)

(72) Inventors: Alexei Davydov, Nizhny Novgorod (RU); Gregory V. Morozov, Nizhny Novgorod (RU); Sameer Pawar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,112

(22) Filed: May 16, 2022

(65) Prior Publication Data
US 2022/0295496 A1 Sep. 15, 2022

Related U.S. Application Data

(63) Continuation of application No. 16/467,566, filed as application No. PCT/US2017/052194 on Sep. 19, 2017, now Pat. No. 11,368,963.

(Continued)

(51) Int. Cl.
*H04W 72/541* (2023.01)
*H04B 17/336* (2015.01)
(Continued)

(52) U.S. Cl.
CPC ........ *H04W 72/541* (2023.01); *H04B 17/336* (2015.01); *H04J 13/16* (2013.01); *H04L 5/005* (2013.01); *H04W 72/046* (2013.01)

(58) Field of Classification Search
None
See application file for complete search history.

(56) References Cited

U.S. PATENT DOCUMENTS

2010/0246527 A1* 9/2010 Montojo ............... H04L 5/0051
370/329
2011/0170496 A1* 7/2011 Fong ..................... H04W 52/24
370/329

(Continued)

FOREIGN PATENT DOCUMENTS

| CA | 2832634 A1 * | 11/2012 | ........... H04B 17/318 |
| EP | 3197087 A1 * | 7/2017 | ........... H04B 7/0626 |
| KR | 2016-0030623 A | 3/2016 | |

OTHER PUBLICATIONS

International Search Report and Written Opinion dated Dec. 15, 2017 for PCT Application PCT/US2017/052194.

(Continued)

*Primary Examiner* — Ajit Patel
(74) *Attorney, Agent, or Firm* — Eschweiler & Potashnik, LLC

(57) ABSTRACT

Techniques discussed herein can facilitate reduced density CSI (Channel State Information)-RS (Reference Signals). One example embodiment can be employed at a UE (User Equipment) and can comprise processing circuitry configured to receive and process a configuration message that comprises one or more configuration parameters for one or more CSI (Channel State Information)-RS (Reference Signal) APs (Antenna Ports) of a configurable density CSI-RS. The configuration parameters indicate a density of CSI-RS resource per Physical Resource Block (PRB) per CSI-RS AP and a PRB offset. The processing circuitry is further configured to determine a set of REs (Resource Elements) for the one or more CSI-RS APs of the configurable density CSI-RS based on the one or more configuration parameters (Continued)

and perform measurements on the configurable density CSI-RS from the set of REs to determine one or more CSI parameters. The one or more configuration parameters are provided per CSI-RS resource configuration.

20 Claims, 13 Drawing Sheets

Related U.S. Application Data

(60) Provisional application No. 62/397,695, filed on Sep. 21, 2016.

(51) Int. Cl.
*H04J 13/16* (2011.01)
*H04L 5/00* (2006.01)
*H04W 72/044* (2023.01)

(56) References Cited

U.S. PATENT DOCUMENTS

| | | |
|---|---|---|
| 2013/0272215 A1 | 10/2013 | Khoryaev |
| 2014/0086085 A1 | 3/2014 | Zheng |
| 2014/0098785 A1 | 4/2014 | Frenne |
| 2019/0372641 A1 | 12/2019 | Muruganathan |
| 2020/0404635 A1 | 12/2020 | Bendlin |

OTHER PUBLICATIONS

International Preliminary Report on Patentability dated Mar. 26, 2019 for PCT Application PCT/US2017/052194.
Non-Final Office Action dated Oct. 26, 2020 in connection with U.S. Appl. No. 16/467,566.
Non-Final Office Action dated May 27, 2021 in connection with U.S. Appl. No. 16/467,566.
Notice of Allowance dated Feb. 15, 2022 in connection with U.S. Appl. No. 16/467,566.

* cited by examiner

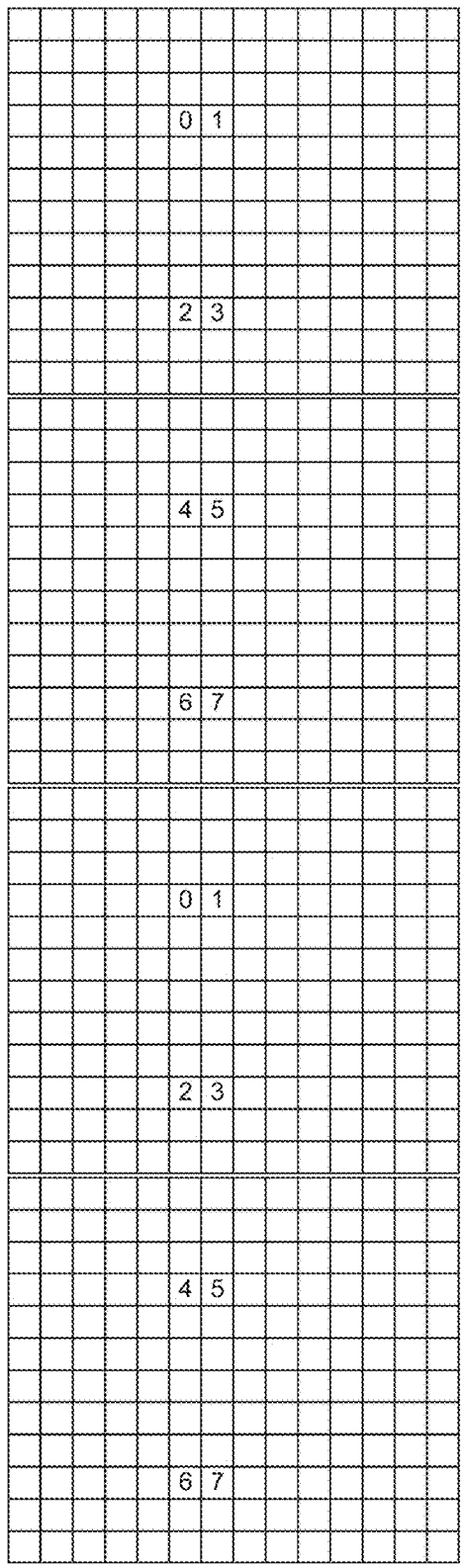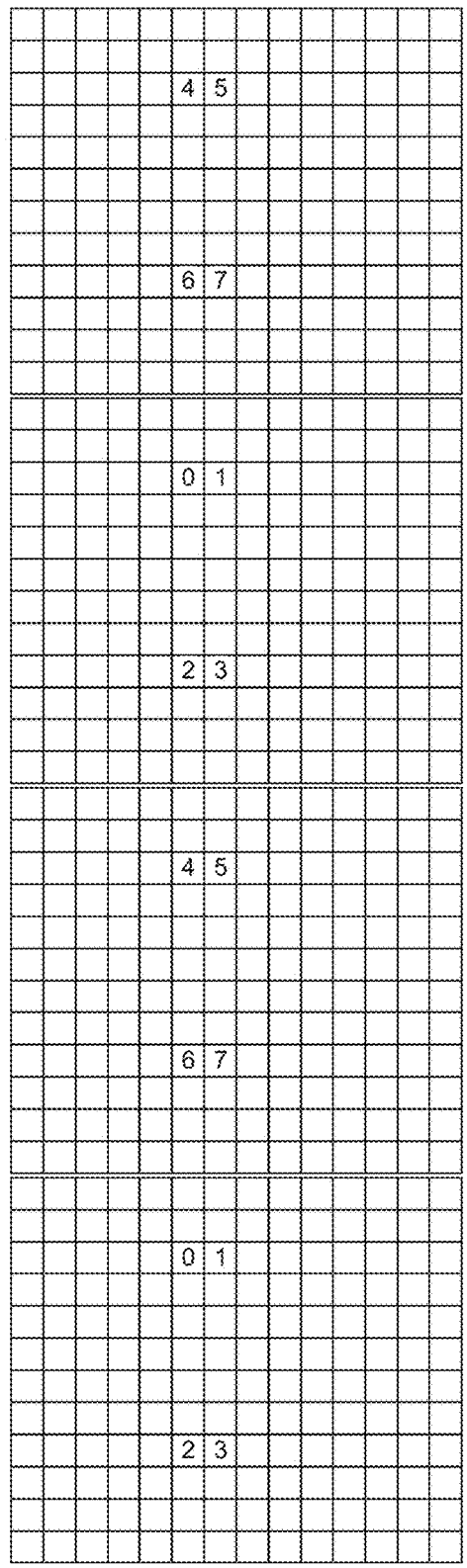
CSI-RS AP=15+#
FIG. 10

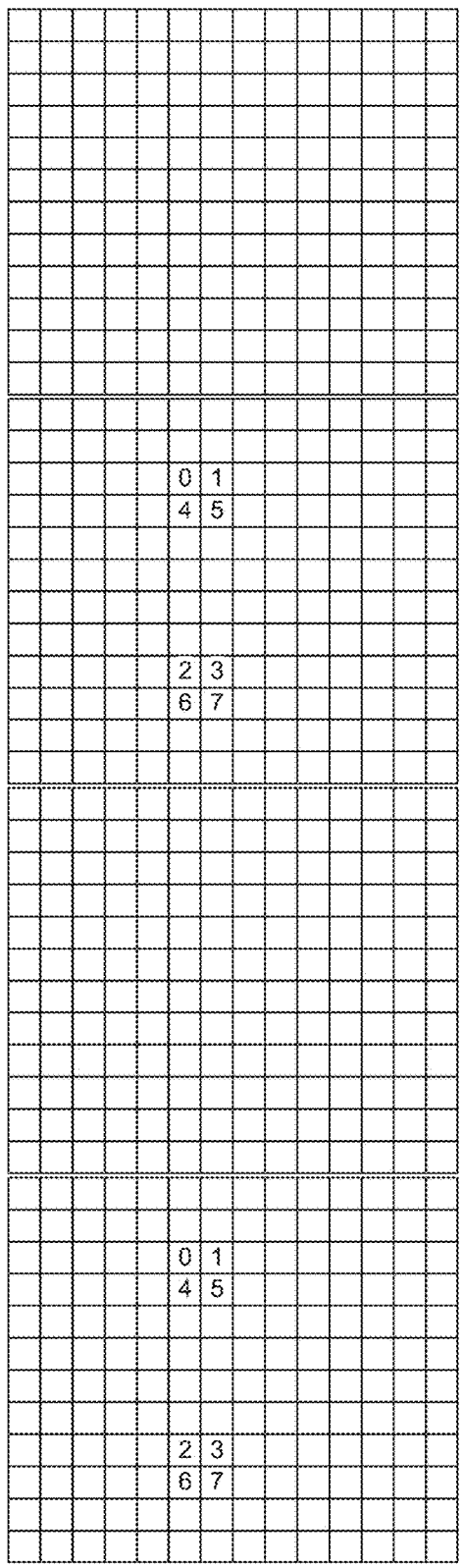
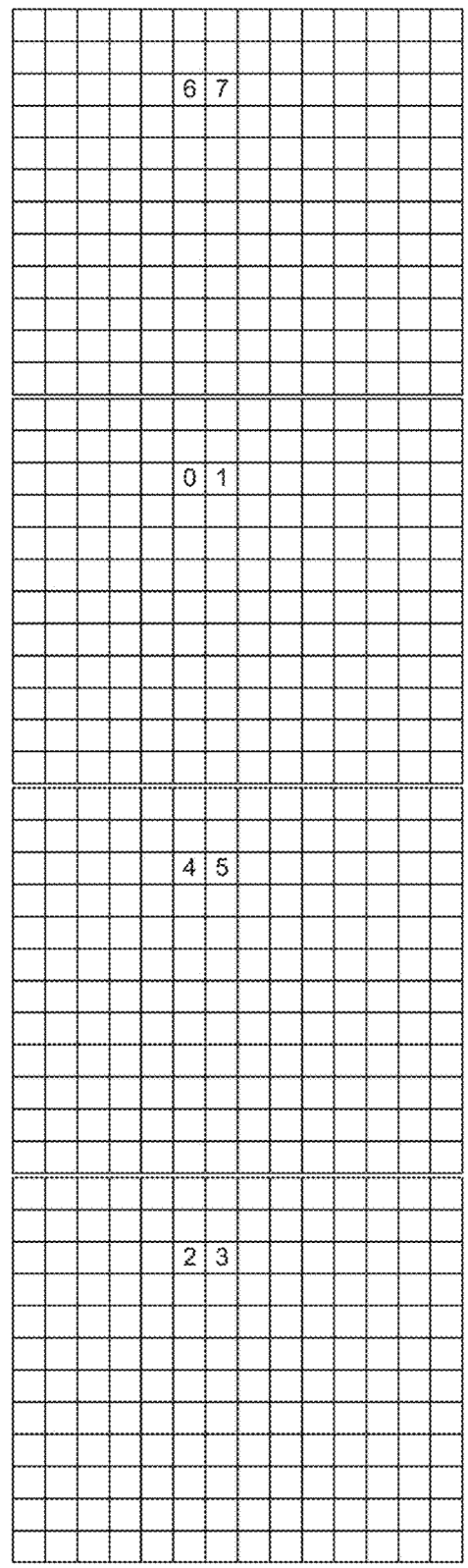
CSI-RS AP=15+#
FIG. 11

REDUCED CSI (CHANNEL STATE INFORMATION)-RS (REFERENCE SIGNAL) DENSITY SUPPORT FOR FD (FULL DIMENSIONAL)-MIMO (MULTIPLE INPUT MULTIPLE OUTPUT) SYSTEMS

REFERENCE TO RELATED APPLICATIONS

This application is a Continuation of U.S. application Ser. No. 16/467,566 filed on Jun. 7, 2019, which is a National Phase entry application of International Patent Application No. PCT/US2017/052194 filed Sep. 19, 2017, which claims priority to U.S. Provisional Application No. 62/397,695 filed Sep. 21, 2016, entitled "REDUCED CSI-RS DENSITY SUPPORT FOR FD-MIMO", the contents of which are herein incorporated by reference in their entirety.

FIELD

The present disclosure relates to wireless technology, and more specifically to techniques for reducing CSI (Channel State Information)-RS (Reference Signal) density in FD (Full Dimensional)-MIMO (Multiple Input Multiple Output) systems.

BACKGROUND

The 3GPP (Third Generation Partnership Project) Rel-8 (Release 8) MIMO (Multiple Input Multiple Output) and subsequent MIMO enhancements in Rel-10 and Rel-11 were designed to support antenna configurations at the eNodeB (Evolved Universal Terrestrial Radio Access Network (E-UTRAN) Node B) that are capable of adaptation in azimuth only. Recently, there has been a significant interest in enhancing system performance through the use of antenna systems having a two-dimensional array structure that provides adaptive control over both the elevation dimension and the azimuth dimension. The additional control over the elevation dimension enables a variety of strategies such as sector-specific elevation beamforming (e.g., adaptive control over the vertical pattern beamwidth and/or downtilt), advanced sectorization in the vertical domain, and user-specific elevation beamforming. Vertical sectorization can improve average system performance through the higher gain of the vertical sector patterns, but vertical sectorization generally does not need additional standardization support. UE (User Equipment)-specific elevation beamforming promises to increase the SINR (Signal-to-Interference-plus-Noise Ratio) statistics seen by the UEs by pointing the vertical antenna pattern in the direction of the UE while spraying less interference to adjacent sectors by virtue of being able to steer the transmitted energy in elevation.

BRIEF DESCRIPTION OF THE DRAWINGS

FIG. 10 is a pair of diagrams illustrating example CSI-RS patterns with reduced density, according to various aspects described herein.

FIG. 11 is a pair of diagrams illustrating additional example CSI-RS patterns with reduced density, according to various aspects described herein.

DETAILED DESCRIPTION

Figure 1:
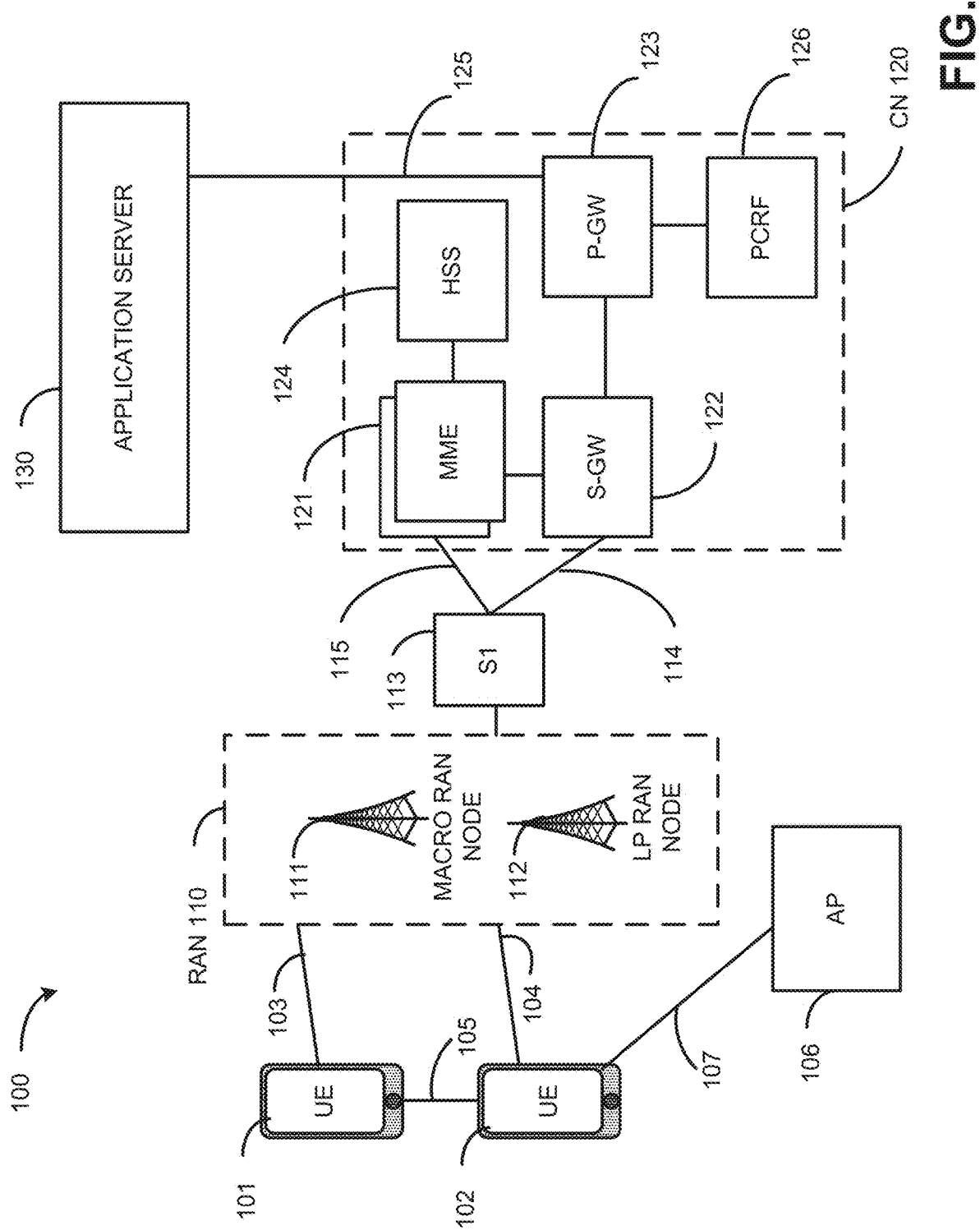
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voiceover-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
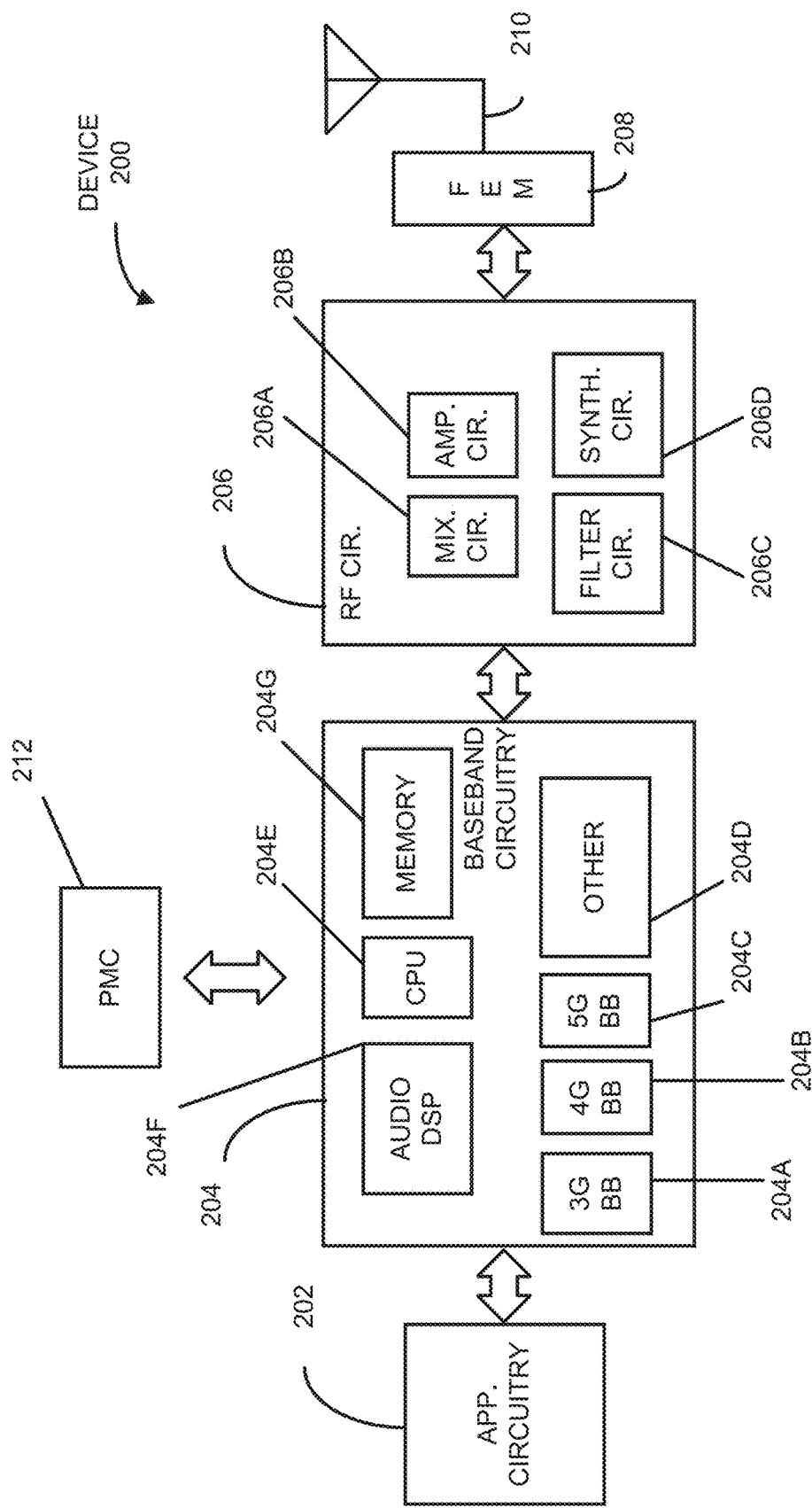
FIG. 2 is a diagram illustrating example components of a device that can be employed in accordance with various aspects discussed herein.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tailbiting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications circuitry 202 depending on the desired output frequency. In some embodiments, a divider control input (e.g., N) may be determined from a look-up table based on a channel indicated by the applications circuitry 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
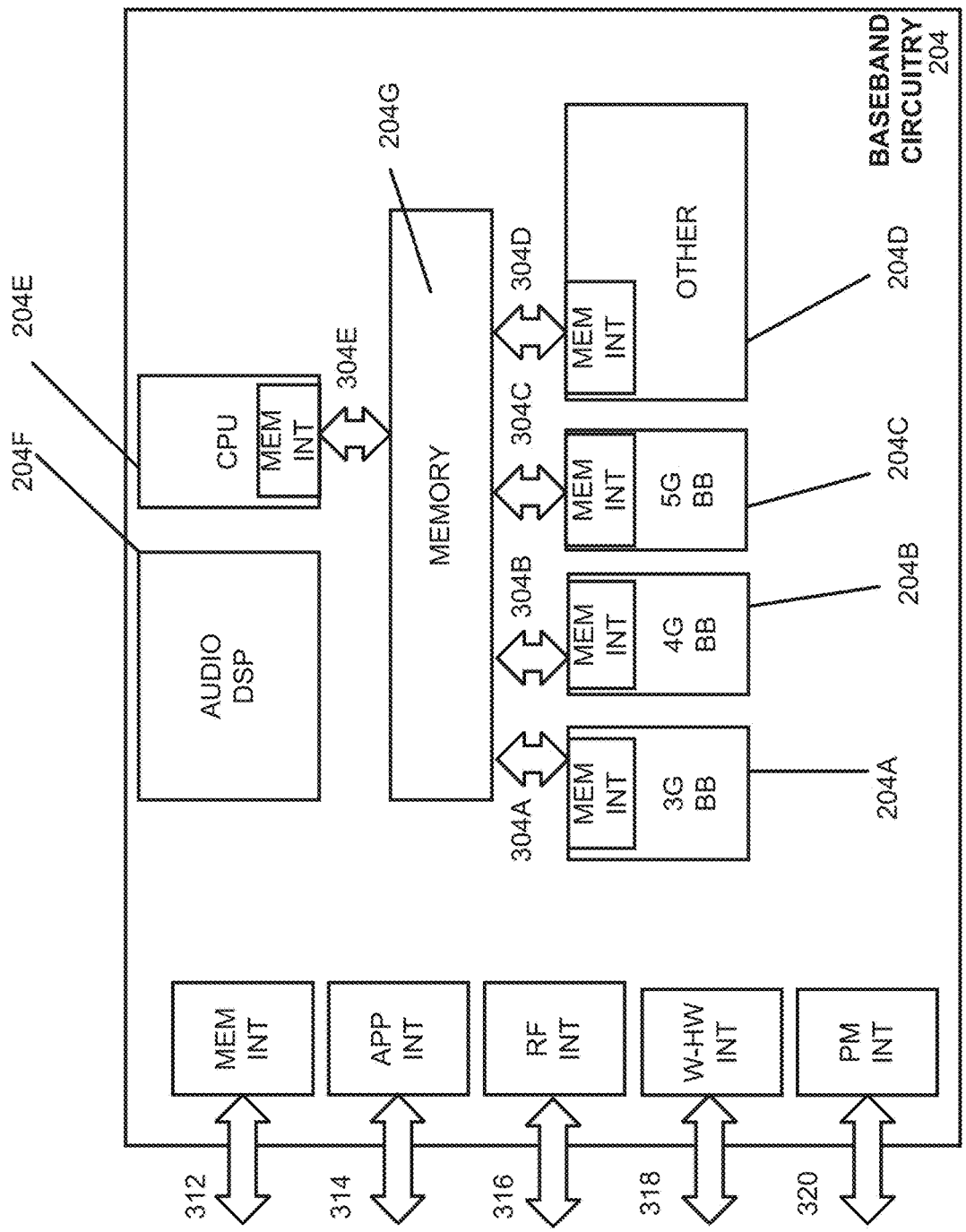
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
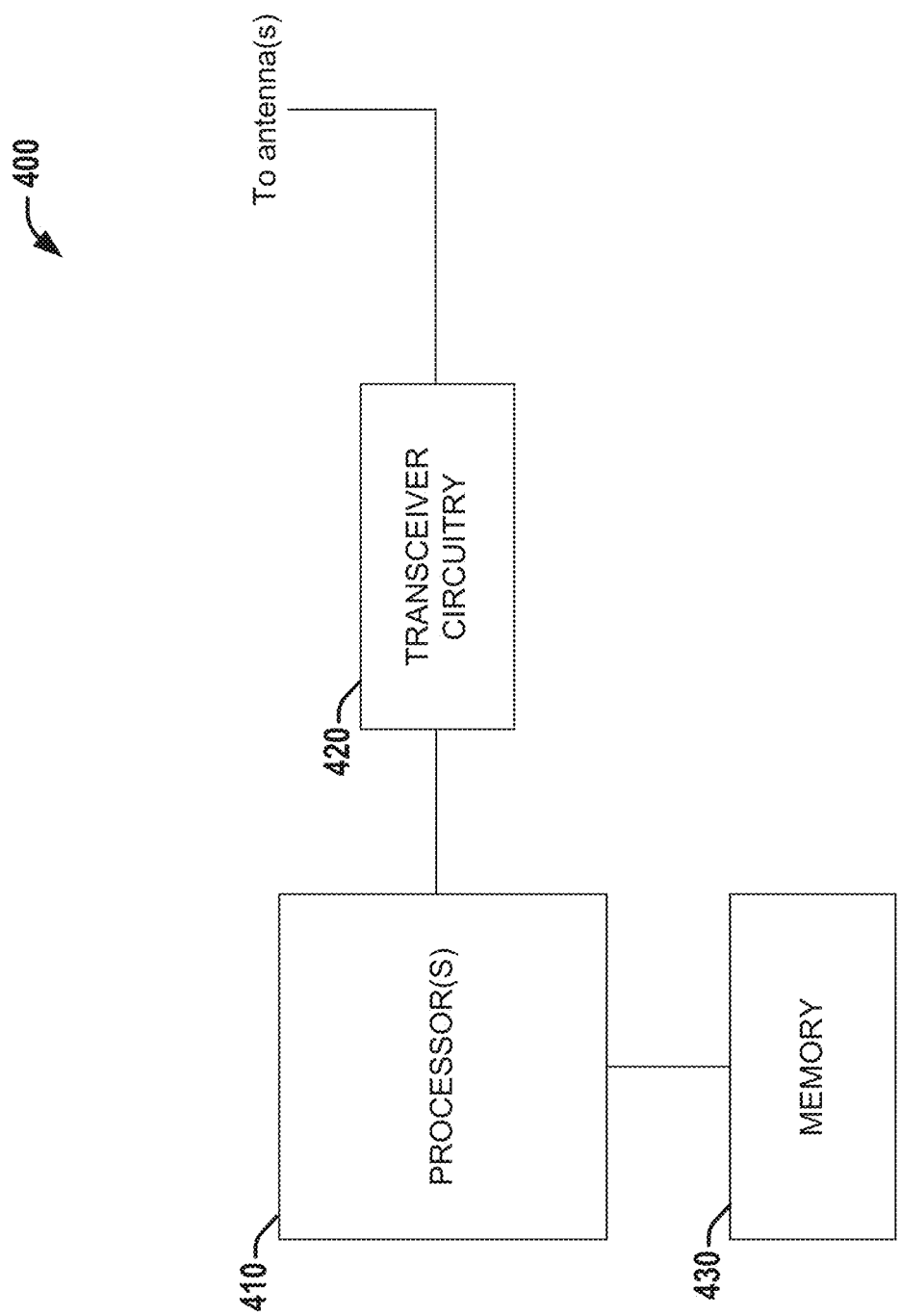
FIG. 4 is a block diagram illustrating a system employable at a UE (User Equipment) that facilitates determination of CSI (Channel State Information) feedback based on reduced density CSI-RS (Reference Signal(s)), according to various aspects described herein.

Referring to FIG. 4, illustrated is a block diagram of a system 400 employable at a UE (User Equipment) that facilitates determination of CSI (Channel State Information) feedback based on reduced density CSI-RS, according to various aspects described herein. System 400 can include one or more processors 410 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), transceiver circuitry 420 (e.g., comprising one or more of transmitter circuitry or receiver circuitry, which can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE). As described in greater detail below, system 400 can facilitate configuration of the UE to receive reduced density CSI-RS, and subsequent CSI feedback.

In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deinterleaving, demodulation, descrambling, and/or decoding.

Figure 5:
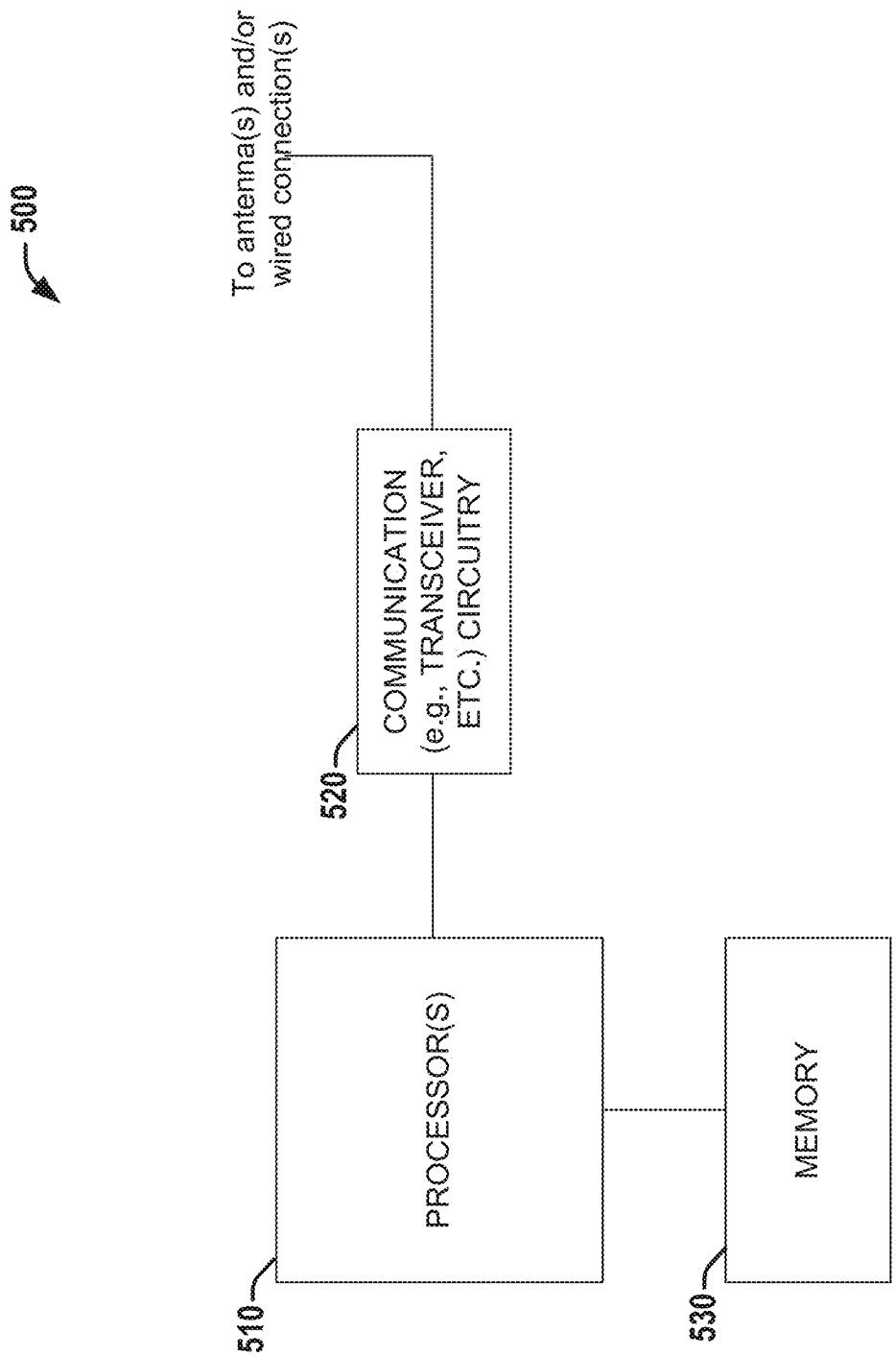
FIG. 5 is a block diagram illustrating a system employable at a BS (Base Station) that facilitates configuration for and transmission of reduced density CSI-RS to one or more UEs, according to various aspects described herein.

Referring to FIG. 5, illustrated is a block diagram of a system 500 employable at a BS (Base Station) that facilitates configuration for and transmission of reduced density CSI-RS to one or more UEs, according to various aspects described herein. System 500 can include one or more processors 510 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), communication circuitry 520 (e.g., which can comprise circuitry for one or more wired (e.g., X2, etc.) connections and/or transceiver circuitry that can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can facilitate configuration of one or more UEs for reduced density CSI-RS.

Figure 6:
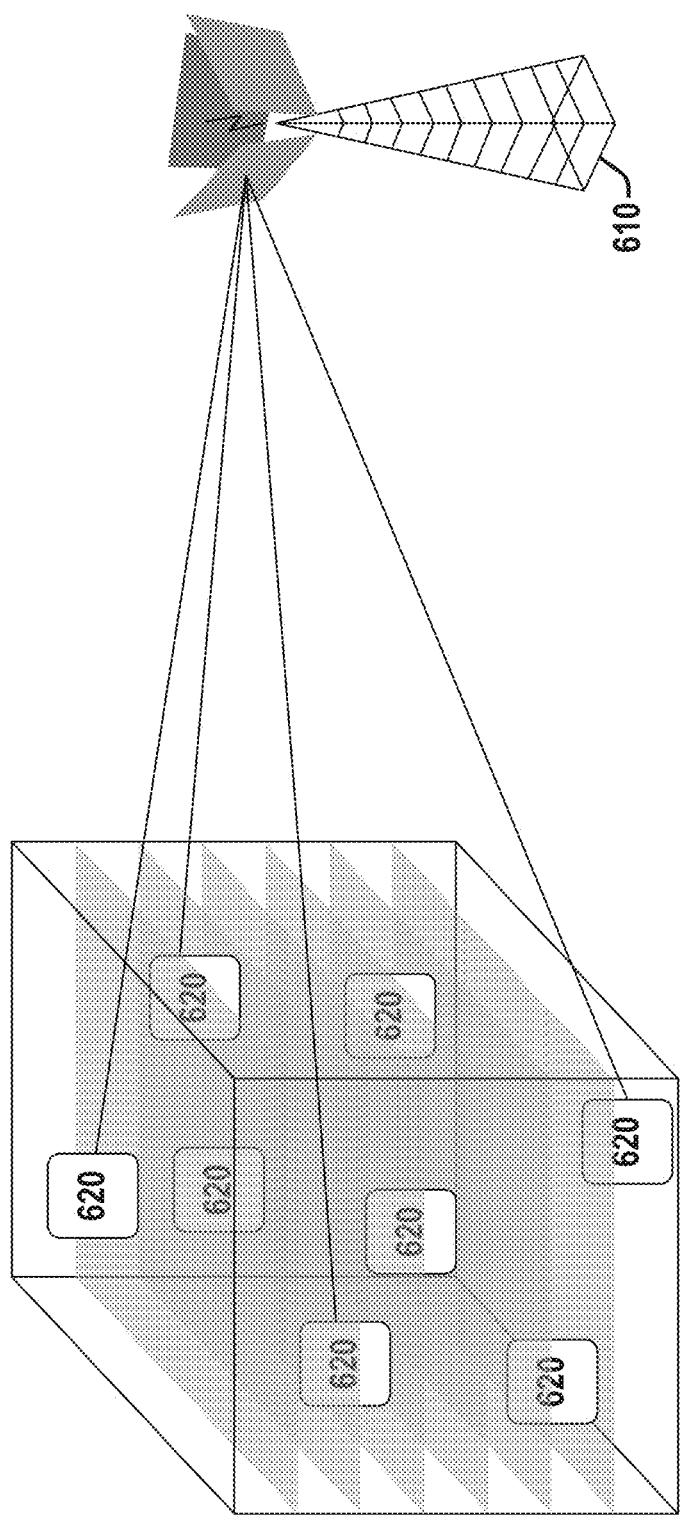
FIG. 6 is a diagram illustrating an example scenario implementing elevation beamforming in a FD-MIMO system, showing an example BS (e.g., gNB, eNB, etc.) employing elevation beamforming to transmit to a plurality of UEs at different elevations, in connection with various aspects described herein.

Referring to FIG. 6, illustrated is a diagram of an example scenario implementing elevation beamforming in a FD-MIMO system, showing an example BS (e.g., gNB, eNB, etc.) 610 employing elevation beamforming to transmit to a plurality of UEs 620 at different elevations, in connection with various aspects described herein.

In Rel-13 FD (Full Dimensional)-MIMO, two types of CSI (Channel State Information) feedback schemes were specified to support FD-MIMO—class A (also known as CSI for non-precoded CSI-RS (Reference Signal)) and class B (also known as CSI for beamformed CSI-RS). In the class A scheme, CSI-RS is transmitted from each physical antenna of the eNB without additional beamforming, while in class B, the CSI-RS antenna ports are beamformed prior to transmission from the physical antennas. Due to the beamforming gain, CSI reporting for class B can be advantageous, especially in coverage limited scenarios (e.g., higher frequency band deployment scenarios).

The cell-edge performance for SU (Single User)-MIMO and cell-center performance for MU (Multi User)-MIMO can be improved by using high resolution feedback. For class B CSI reporting, high resolution feedback can be achieved by transmitting additional CSI-RS resources (K>1) or ports (K=1), which can be associated with the additional beams. For example, the additional beams can be obtained by 'x' times beam oversampling, which involves 'x' times more CSI-RS resources or ports comparing to CSI reporting without beam oversampling. However, these additional CSI-RS resources or ports increase overhead involved in CSI-RS, and impact system performance. In various aspects, techniques discussed herein can be employed to reduce overhead due to CSI-RS, which can minimize the impact on system performance due to of the additional CSI-RS resource(s) or port(s).

In Rel-13 (3GPP Release 13), CSI-RS for class B relies on the legacy structure of CSI-RS defined in LTE (Long Term Evolution)-A (Advanced) for Rel-10. The legacy CSI-RS supports 1, 2, 4 or 8 antenna ports. The density of conventional CSI-RS (e.g., generated by processor(s) 510, transmitted via communication circuitry 520, received via transceiver circuitry 420, and processed by processor(s) 410) is 1 resource element per PRB (Physical Resource Block) per CSI-RS antenna port. Conventional CSI-RS can be located in every PRB pair and periodically transmitted with a minimum periodicity of 5 ms. The CSI-RS structure for different numbers of antenna ports can have a nested structure, such that the CSI-RS resources corresponding to a lower number of antenna ports can be a subset of the CSI-RS resource of a CSI-RS pattern corresponding to higher number of CSI-RS antenna ports. The parameters of CSI-RS can be configured to the UE using DCI (Downlink Control Information) and/or higher layer signaling (e.g., RRC (Radio Resource Control) messaging generated by processor(s) 510, transmitted via communication circuitry 520, received via transceiver circuitry 420, and processed by processor(s) 410).

Figure 7:
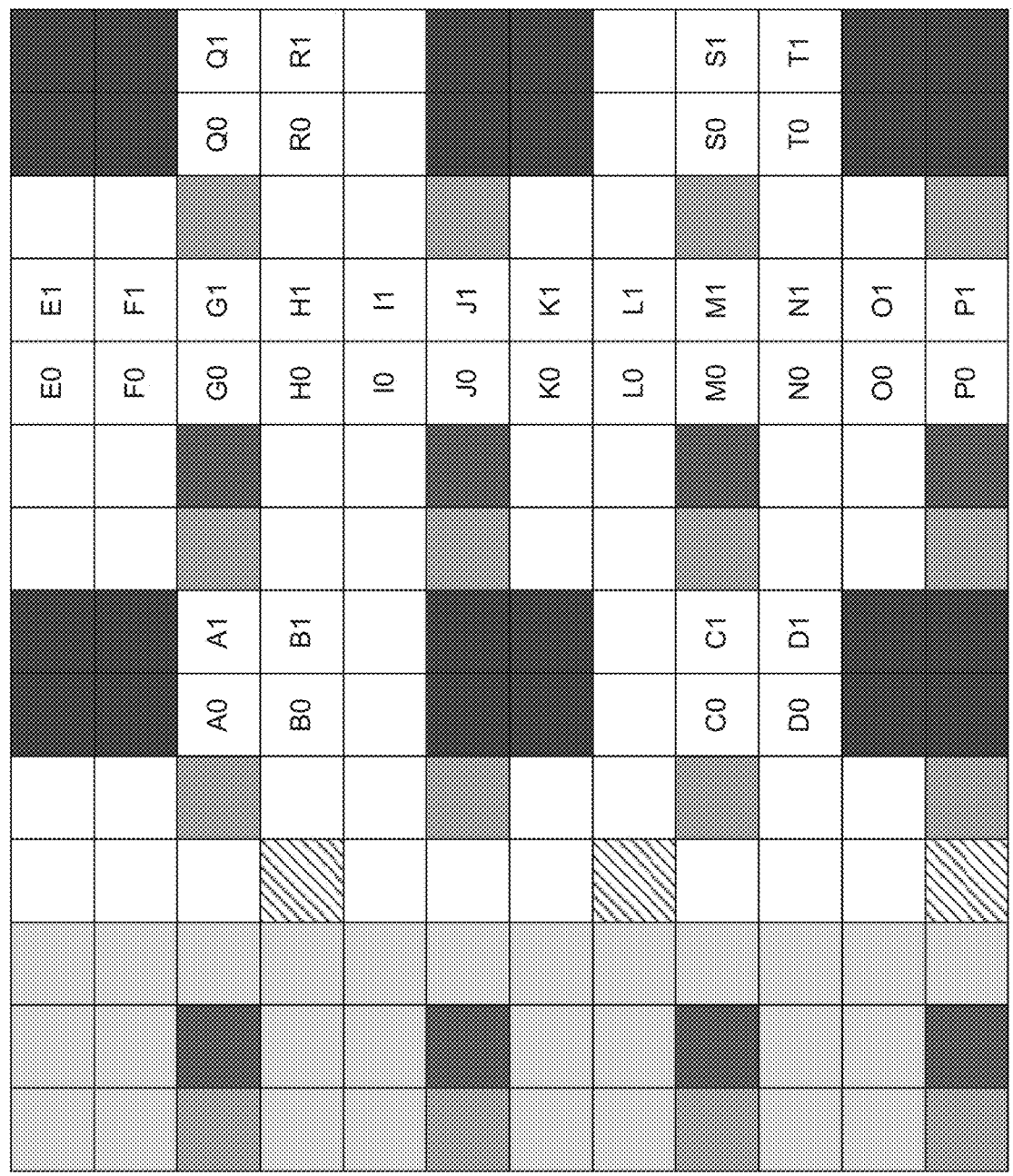
FIG. 7 is a diagram illustrating a physical resource block showing example CSI (Channel State Information)-RS (Reference Signal) patterns corresponding to 2 CSI-RS antenna ports for normal cyclic prefix (CP), in connection with various aspects described herein.
Figure 8:
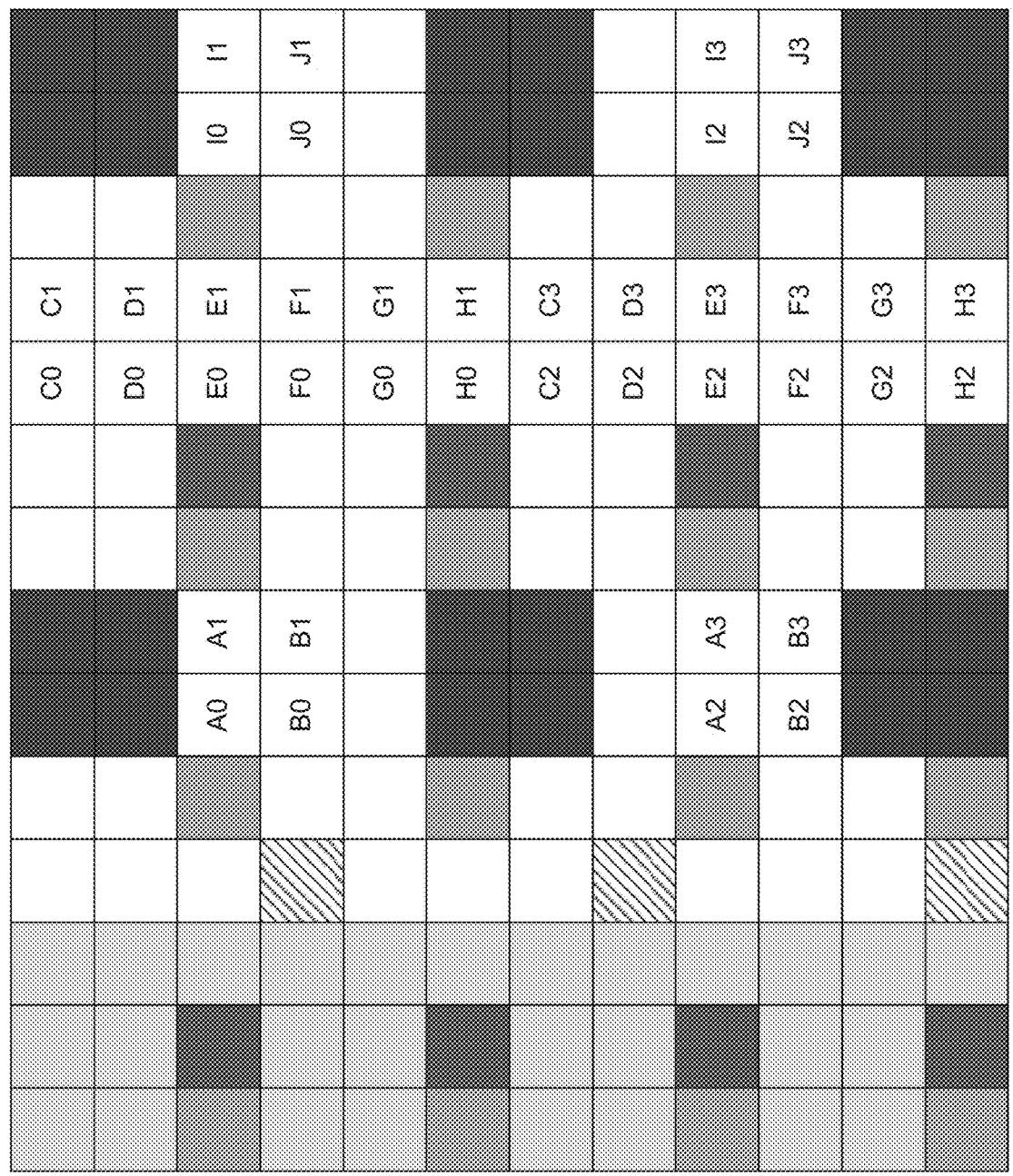
FIG. 8 is a diagram illustrating a physical resource block showing example CSI-RS patterns corresponding to 4 CSI-RS antenna ports for normal CP, in connection with various aspects described herein.
Figure 9:
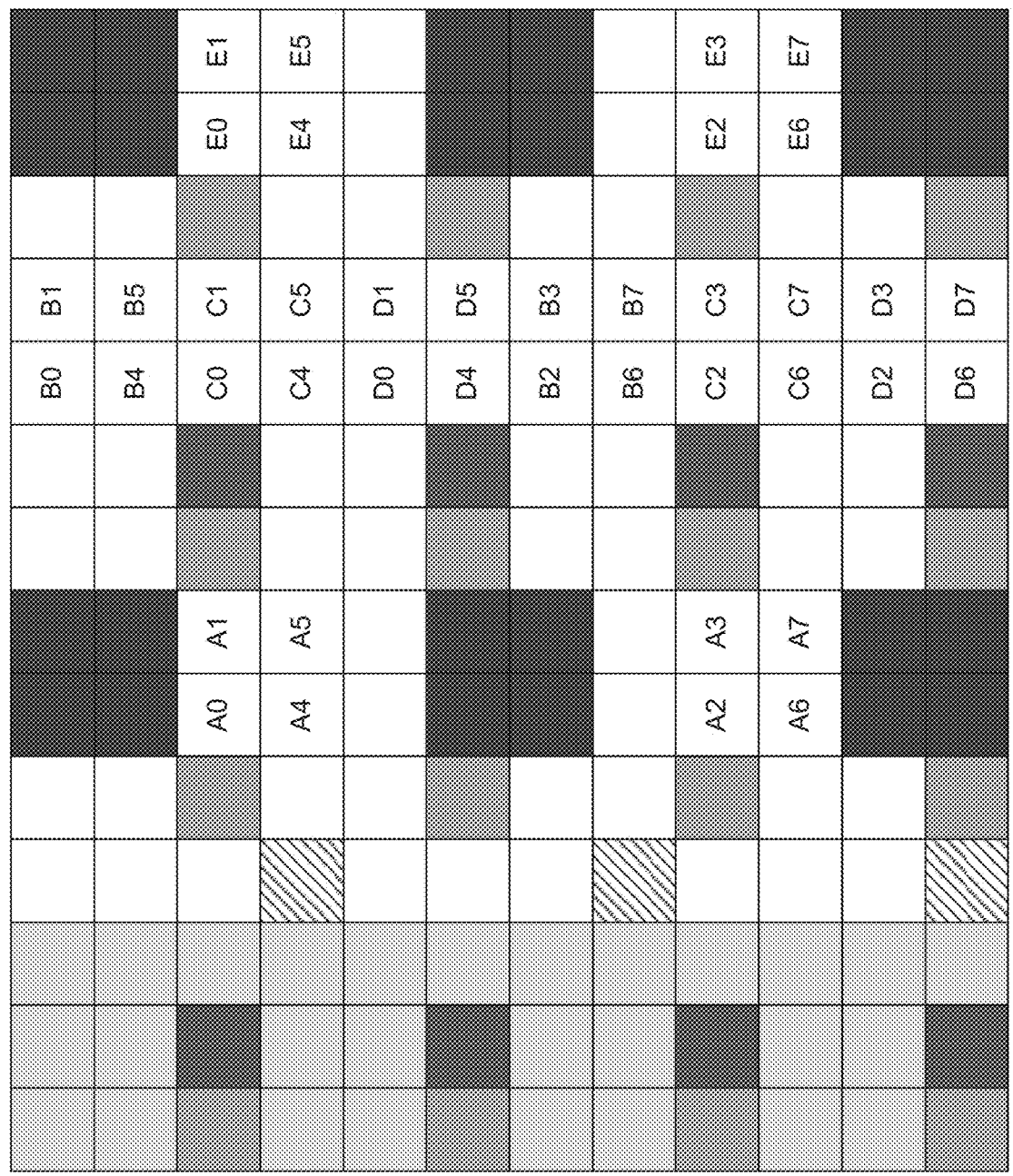
FIG. 9 is a diagram illustrating a physical resource block showing example CSI-RS patterns corresponding to 8 CSI-RS antenna ports for normal CP, in connection with various aspects described herein.

Referring to FIG. 7, illustrated is a diagram of a physical resource block showing example CSI-RS patterns (labeled A-T) corresponding to 2 CSI-RS ports are shown for normal cyclic prefix (CP), where ports 0-1 (e.g., A0-A1, B0-B1, etc.) correspond to CSI-RS ports 15-16, respectively, in connection with various aspects described herein. Referring to FIG. 8, illustrated is a diagram of a physical resource block showing example CSI-RS patterns (labeled A-J) corresponding to 4 CSI-RS ports are shown for normal CP, where ports 0-3 (e.g., A0-A3, B0-B3, etc.) correspond to CSI-RS ports 15-18, respectively in connection with various aspects described herein. Referring to FIG. 9, illustrated is a diagram of a physical resource block showing example CSI-RS patterns (labeled A-E) corresponding to 8 CSI-RS ports are shown for normal CP, where ports 0-7 (e.g., A0-A7, B0-B7, etc.) correspond to CSI-RS ports 15-22, respectively, in connection with various aspects described herein.

In various aspects, techniques and associated control signaling are discussed herein that can facilitate CSI-RS having a reduced density. These techniques can include: (a) Separate and/or joint coding of PRB decimation and PRB offset for indication (e.g., via DCI and/or higher layer signaling generated by processor(s) 510, transmitted via communication circuitry 520, received via transceiver circuitry 420, and processed by processor(s) 410) of the reduced density CSI-RS transmission, (b) PDSCH (Physical Downlink Shared Channel) RE (Resource Element) mapping determination based on the non-reduced density of NZP (Non-Zero Power) CSI-RS, (c) Collision handling of NZP CSI-RS with broadcast channels (e.g., including channels with system and paging information) based on non-reduced density of NZP CSI-RS, and (d) Antenna port renumbering for localized beam transmission on NZP CSI-RS REs.

In various aspects, a PRB decimation (e.g., which can indicate a density of reduced density CSI-RS, for example, of 1 resource element per N PRBs per CSI-RS antenna port, where N is the PRB decimation) and a PRB offset (which can indicate an offset in terms of a number of PRBs and/or portions thereof (e.g., subcarriers) for some or all of CSI-RS APs relative to the CSI-RS configuration) can be employed to indicate the REs employed for transmission (e.g., by communication circuitry 520) of reduced density CSI-RS (e.g., generated by processor(s) 510). In various aspects, the PRB decimation and/or the PRB offset can be indicated by a BS (e.g., gNB, eNB, etc.) to the UE using two independent parameters such as PRB decimation and PRB offset (e.g., via DCI (Downlink Control Information) and/or higher layer signaling generated by processor(s) 510, transmitted via communication circuitry 520, received via transceiver circuitry 420, and processed by processor(s) 410). In some such aspects, the PRB decimation and the PRB offset can be separately indicated (e.g., in the same or different DCI or higher layer signaling, etc.).

In various aspects, to reduce control signaling (e.g., for DCI based indication, etc.), joint coding of the PRB decimation and the PRB offset can be employed (e.g., via DCI and/or higher layer signaling generated by processor(s) 510, transmitted via communication circuitry 520, received via transceiver circuitry 420, and processed by processor(s) 410). For joint coding aspects, a single parameter (e.g., a CSI-RS density configuration index) can be indicated, where each value of that parameter can correspond to a distinct combination of values of the PRB decimation and the PRB offset. One example of joint coding of the PRB decimation and PRB offset for reduced density CSI-RS is provided in Table 1, below, where CSI-RS density configuration index indicates both the PRB decimation and the PRB offset for CSI-RS REs. The rows in Table 1 corresponding to PRB decimation value of X contains PRB offsets 0, . . . , X−1, where X is the density of CSI-RS antenna port transmission, the number of PRBs per antenna port.

TABLE 1

Example joint coding of PRB decimation and PRB offset

| CSI-RS density configuration index | PRB decimation for CSI-RS REs (PRBs) | PRB offset for CSI-RS REs (PRBs) |
| --- | --- | --- |
| 0 | 0 | 0 |
| 1 | 2 | 0 |
| 2 | 2 | 1 |
| 3 | 4 | 0 |
| 4 | 4 | 1 |
| 5 | 4 | 2 |
| 6 | 4 | 3 |

In various embodiments, the PRB decimation and the PRB offset can be separately indicated, or can be jointly indicated as in Table 1 or similarly, based on a single parameter (e.g., CSI-RS density configuration index, etc.) with values that each correspond to a distinct pair of a PRB decimation (e.g., in PRBs) and a PRB offset (e.g., in PRBs and/or subcarriers).

In various aspects, a PRB decimation and a PRB offset can be provided or configured (e.g., via DCI and/or higher layer signaling generated by processor(s) 510, transmitted via communication circuitry 520, received via transceiver circuitry 420, and processed by processor(s) 410): (a) per CSI-RS AP (antenna port), wherein the number of parameters (for joint indication) or parameter sets (for separate indication) of the reduced density CSI-RS corresponds to the number of CSI-RS APs; (b) per group of CSI-RS APs, wherein the number of parameters (for joint indication) or parameter sets (for separate indication) of the reduced density CSI-RS corresponds to the number of CSI-RS AP groups; (c) per CSI-RS resource configuration, wherein the number of parameters (for joint indication) or parameter sets (for separate indication) of the reduced density CSI-RS corresponds to the number of CSI-RS resource configurations per NZP CSI-RS resource; or (d) per NZP CSI-RS resource comprising aggregation of one or more CSI-RS resource configurations.

In various aspects, the parameters of reduced density CSI-RS (e.g., PRB decimation and PRB offset, either separately or jointly indicated) can be indicated using DCI and/or RRC (e.g., generated by processor(s) 510, transmitted via communication circuitry 520, received via transceiver circuitry 420, and processed by processor(s) 410). In some aspects (e.g., employing separate indication of PRB decimation and PRB offset, etc.), a combination of RRC and DCI (e.g., generated by processor(s) 510, transmitted via communication circuitry 520, received via transceiver circuitry 420, and processed by processor(s) 410) can be employed to indicate the parameters of reduced density CSI-RS. In one example, the PRB decimation (density of port CSI-RS REs) can be configured via RRC (e.g., generated by processor(s) 510, transmitted via communication circuitry 520, received via transceiver circuitry 420, and processed by processor(s) 410) and the PRB offset can be provided using DCI (e.g., generated by processor(s) 510, transmitted via communication circuitry 520, received via transceiver circuitry 420, and processed by processor(s) 410).

In various aspects, the collision handling of reduced density CSI-RS (e.g., with ZP or other NZP CSI-RS resource, paging messages (e.g. in the primary cell in subframes/slots configured for transmission of paging messages in the primary cell for any UE with the cell-specific paging configuration), broadcast messages (e.g. transmitted SIBs (e.g., SystemInformationBlockType1, etc.)), etc.) can be managed based on assuming non-reduced density (e.g., conventional) CSI-RS, where the CSI-RS antenna ports can be assumed as transmitted on each PRB regardless of the actual CSI-RS density configuration.

In various aspects, mapping (e.g., by processor(s) 510) of PDSCH (Physical Downlink Shared Channel) REs (Resource Elements) can be also determined (e.g., by processor(s) assuming non-reduced density CSI-RS (e.g., where each CSI-RS AP is transmitted in every PRB), regardless of the actual CSI-RS density configuration.

In various aspects, groups of CSI-RS antenna ports (e.g., generated by processor(s) 510) can be transmitted (e.g., via communication circuitry 520) with the same PRB offset or with different PRB offsets. Referring to FIG. 10, illustrated is a diagram showing two examples of reduced density CSI-RS wherein groups of CSI-RS antenna ports are transmitted with different PRB offsets, according to various aspects discussed herein. Referring to FIG. 11, illustrated is a diagram showing two examples of reduced density CSI-RS, with the left example having groups of CSI-RS antenna ports transmitted with the same PRB offsets and the right example having groups of CSI-RS antenna ports transmitted with different PRB offsets, according to various aspects discussed herein. In both examples of FIG. 10, the antenna ports corresponding to the first group containing antenna ports {19,20,21,22} (e.g., as generated by processor(s) 510) can be transmitted (e.g., by communication circuitry 520) with one PRB offset on even PRBs, while the second group of antenna ports {15,16,17,18} (e.g., as generated by processor(s) 510) can be transmitted (e.g., by communication circuitry 520) with another PRB offset on odd PRBs. For example, the left example of FIG. 10 can have a PRB offset of 11 subcarriers for APs {15,16,17,18} and 0 subcarriers for APs {19,20,21,22}, while the right example of FIG. 10 can have a PRB offset of 0 subcarriers for APs {15,16,17,18} and 13 subcarriers for APs {19,20,21,22}. In the left example of FIG. 11, the same PRB offset can be applied (e.g., by processor(s) 510 and communication circuitry 520) for all APs, while in the right example, a different PRB offset can be applied (e.g., by processor(s) 510 and communication circuitry 520) for each pair of APs {15,16}, {17,18}, {19,20}, and {21,22}.

In various aspects, as in each of the examples of FIGS. 10 and 11, PRB offset(s) can be applied (e.g., by processor(s) 510 and communication circuitry 520) to groups of CSI-RS APs such that the occupied REs (in occupied PRBs) corresponded to a predefined CSI-RS pattern as shown in FIG. 7, 8, or 9. In other aspects, other PRB offsets can be applied.

Due to the current structure of CSI-RS, the antenna ports in the {15,16,17,18} group can correspond to a first polarization (e.g., horizontal or vertical) of four different beams, and the APs in the {19,20,21,22} can correspond to a second polarization (e.g., vertical or horizontal) of the same beams. As a result, in scenarios with mappings of APs {15,16,17,18} and {19,20,21,22} to different PRBs, the antenna ports corresponding to the same beam but different polarizations can experience different phase drifts that might be difficult to compensate using PMIs (Precoding Matrix Indicators). In various aspects, to solve the phase drifting issue, antenna port renumbering can be applied (e.g., by processor(s) 410 and/or processor(s) 510) prior to CSI calculation. The renumbering of antenna ports can ensure that the same beam corresponding to different polarizations can be transmitted (e.g., by communication circuitry 520) on the same pair of REs (e.g., as mapped by processor(s) 510). Equation (1), below, provides an example equation for CSI-RS AP renumbering according to various aspects discussed herein:

$$p = \begin{cases} 15+i & \text{for } p' \in \{15, \ldots, 15+2i\} \\ 15+i+\frac{N_{ports}^{CSI}}{2} & \text{for } p' \in \{16, \ldots, 15+2i+1\} \end{cases} \quad (1)$$

$$i = \left\{0, 1, \ldots, \frac{N_{ports}^{CSI}}{2} - 1\right\},$$

where p' is the antenna port before renumbering (used for channel measurements, e.g., by processor(s) 410), p is the antenna port after renumbering (to be used for CSI calculation, e.g., by processor(s) 410), $N_{ports}^{CSI}$ corresponds to the number of CSI-RS antenna ports (and can be, e.g., 2, 4 or 8, etc.). However, such aspects can be extended beyond conventional numbers of CSI-RS antenna ports. An example of renumbering is for 8 port case is provided below.

In an example of CSI-RS antenna port renumbering for an 8 CSI-RS antenna port case, CSI-RS APs {15,17,19,21} for measurements can correspond to CSI-RS APs {15,16,17,18} for CSI feedback, and CSI-RS APs {16,18,20,22} for measurements can correspond to CSI-RS APs {19,20,21,22} for CSI feedback.

Figure 12:
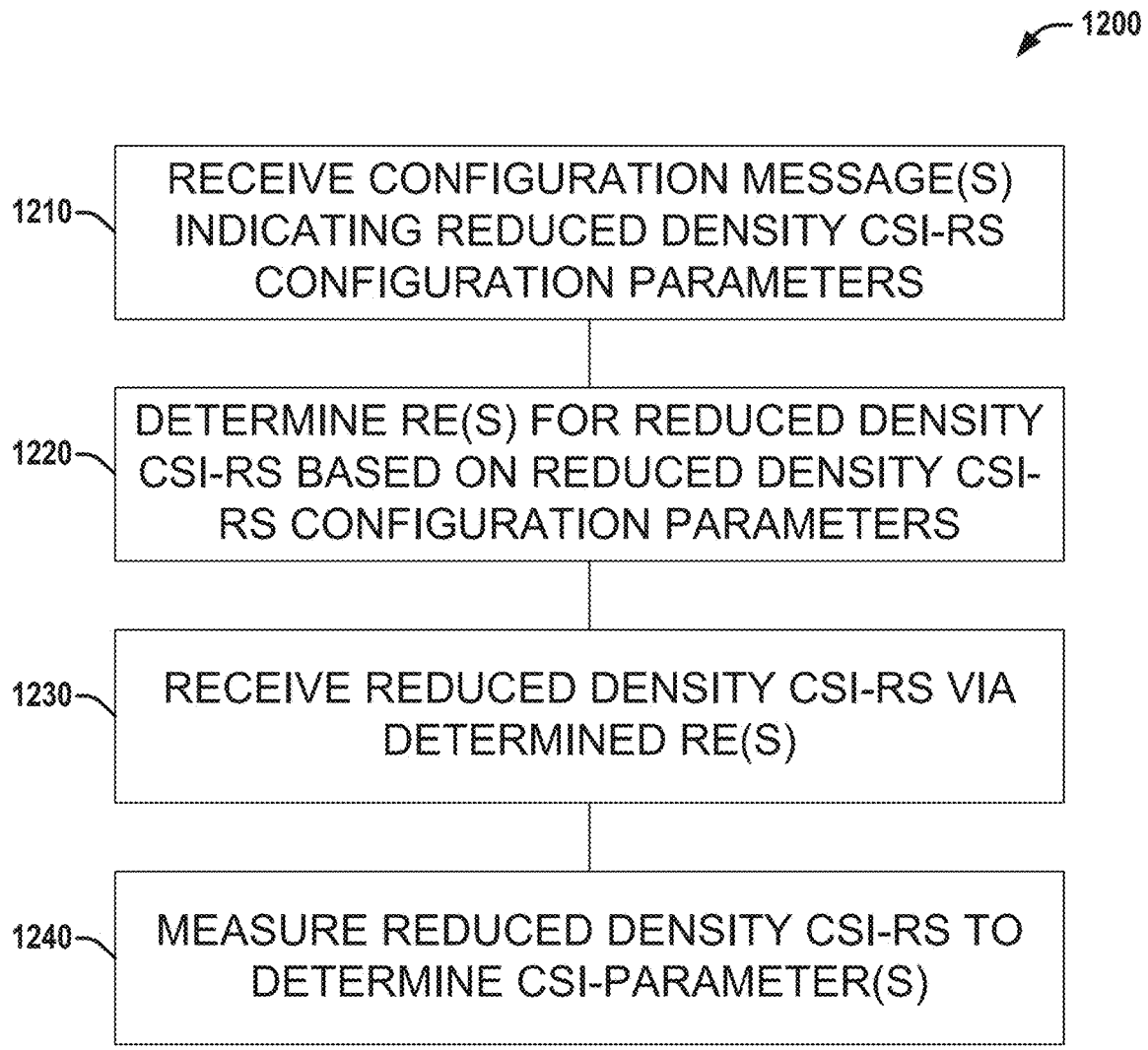
FIG. 12 is a flow diagram of an example method employable at a UE that facilitates reception and measurement of reduced density CSI-RS, according to various aspects discussed herein.

Referring to FIG. 12, illustrated is a flow diagram of an example method 1200 employable at a UE that facilitates reception and measurement of reduced density CSI-RS, according to various aspects discussed herein. In other aspects, a machine readable medium can store instructions associated with method 1200 that, when executed, can cause a UE to perform the acts of method 1200.

At 1210, one or more configuration messages can be received that can indicate one or more configuration parameters for reduced density CSI-RS (e.g., PRB decimation, PRB offset, CSI-RS density configuration index, etc.).

At 1220, a set of REs for reduced density CSI-RS can be determined based on the one or more configuration parameters.

At 1230, reduced density CSI-RS can be received via the determined set of REs.

At 1240, one or more CSI parameters can be measured based on the received reduced density CSI-RS.

Additionally or alternatively, method 1200 can include one or more other acts described herein in connection with system 400.

Figure 13:
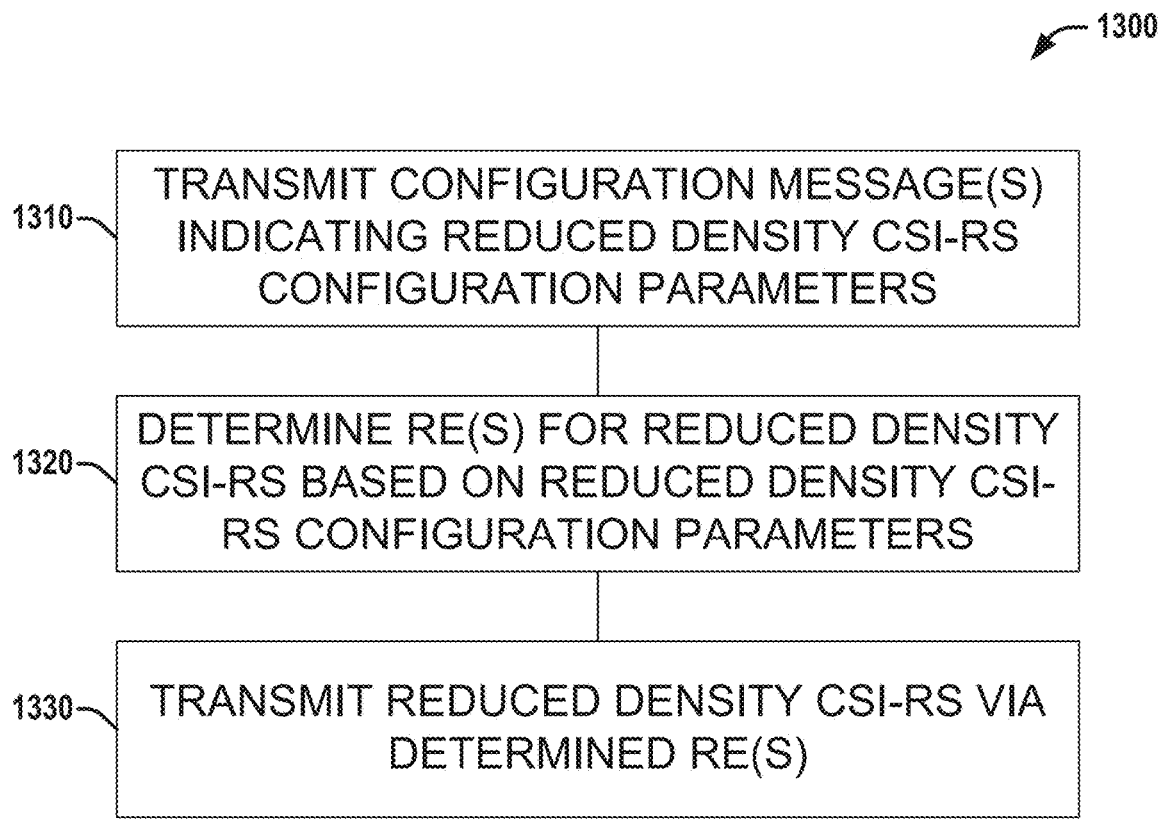
FIG. 13 is a flow diagram of an example method employable at a BS that facilitates configuration for and transmission of reduced density CSI-RS, according to various aspects discussed herein.

Referring to FIG. 13, illustrated is a flow diagram of an example method 1300 employable at a BS that facilitates configuration for and transmission of reduced density CSI-RS, according to various aspects discussed herein. In other aspects, a machine readable medium can store instructions associated with method 1300 that, when executed, can cause a BS to perform the acts of method 1300.

At 1310, one or more configuration messages can be transmitted that can indicate one or more configuration parameters for reduced density CSI-RS (e.g., PRB decimation, PRB offset, CSI-RS density configuration index, etc.).

At 1320, a set of REs for reduced density CSI-RS can be determined based on the one or more configuration parameters.

At 1330, reduced density CSI-RS can be transmitted via the determined set of REs.

Additionally or alternatively, method 1300 can include one or more other acts described herein in connection with system 500.

A first example embodiment employable in connection with aspects discussed herein can comprise a method of transmission (e.g., via communication circuitry 520) of reduced density CSI-RS signals (e.g., generated by processor(s) 510), wherein the method comprises: configuration (e.g., via DCI and/or higher layer signaling generated by processor(s) 510, transmitted via communication circuitry 520, received via transceiver circuitry 420, and processed by processor(s) 410) of 'PRB offset' and 'PRB decimation' parameters for a user equipment (UE), wherein the 'PRB decimation' parameter determines the density of CSI-RS APs in the frequency domain measured in PRBs, and the 'PRB offset' parameter indicates a starting PRB index for reduced density CSI-RS transmission; measurements (e.g., by processor(s) 410) on reduced density CSI-RS (e.g., generated by processor(s) 510, transmitted via communication circuitry 520, received via transceiver circuitry 420, and processed by processor(s) 410) according to the configured parameters; and CSI calculation (e.g., by processor(s) 410) according to the measurement on the reduced density CSI-RS resource elements.

In various aspects of the first example embodiment, the 'PRB decimation' and 'PRB offset' can be independently indicated (e.g., via DCI and/or higher layer signaling generated by processor(s) 510, transmitted via communication circuitry 520, received via transceiver circuitry 420, and processed by processor(s) 410).

In various aspects of the first example embodiment, the 'PRB decimation' and 'PRB offset' can be jointly coded, wherein the 'PRB decimation' and the 'PRB offset' can be indicated via a 'CSI-RS density configuration index' (e.g., via DCI and/or higher layer signaling generated by processor(s) 510, transmitted via communication circuitry 520, received via transceiver circuitry 420, and processed by processor(s) 410).

In various aspects of the first example embodiment, the reduced density CSI-RS parameters can be indicated using DCI signaling (e.g., generated by processor(s) 510, transmitted via communication circuitry 520, received via transceiver circuitry 420, and processed by processor(s) 410).

In various aspects of the first example embodiment, the reduced density CSI-RS parameters can be indicated using RRC signaling (e.g., generated by processor(s) 510, transmitted via communication circuitry 520, received via transceiver circuitry 420, and processed by processor(s) 410).

In various aspects of the first example embodiment employing independent indication of the reduced density CSI-RS parameters, the reduced density CSI-RS parameters can be indicated using RRC and DCI signaling, wherein the 'PRB decimation' can be indicated via RRC (e.g., generated by processor(s) 510, transmitted via communication circuitry 520, received via transceiver circuitry 420, and processed by processor(s) 410) and the 'PRB offset' can be indicated via DCI (e.g., generated by processor(s) 510, transmitted via communication circuitry 520, received via transceiver circuitry 420, and processed by processor(s) 410).

In various aspects of the first example embodiment, the reduced density CSI-RS parameters can be indicated (e.g., via DCI and/or higher layer signaling generated by processor(s) 510, transmitted via communication circuitry 520, received via transceiver circuitry 420, and processed by processor(s) 410) per CSI-RS antenna port.

In various aspects of the first example embodiment, the reduced density CSI-RS parameters can be indicated (e.g., via DCI and/or higher layer signaling generated by processor(s) 510, transmitted via communication circuitry 520, received via transceiver circuitry 420, and processed by processor(s) 410) per CSI-RS antenna port group. In various such aspects, a first CSI-RS AP group comprises a first half of CSI-RS antenna ports and a second CSI-RS AP group comprises a second half of CSI-RS antenna ports.

In various aspects of the first example embodiment, the reduced density CSI-RS parameters can be indicated (e.g., via DCI and/or higher layer signaling generated by processor(s) 510, transmitted via communication circuitry 520, received via transceiver circuitry 420, and processed by processor(s) 410) per CSI-RS resource configuration, which can support different overhead reduction for non-zero power CSI-RS resource aggregations using two or more CSI-RS resource configurations.

In various aspects of the first example embodiment, physical downlink shared channel (PDSCH) mapping (e.g., by processor(s) 510) can be based on assuming a non-reduced density CSI-RS, regardless of the reduced density CSI-RS configuration.

In various aspects of the first example embodiment, collision of CSI-RS with paging messages (e.g., in the primary cell in subframes/slots configured for transmission of paging messages in the primary cell for any UE with the cell-specific paging configuration) and broadcast messages (e.g., transmitted SIBs (System Information Blocks) such as SystemInformationBlockType1) can be based on assuming a non-reduced density CSI-RS regardless of the reduced density CSI-RS configuration.

In various aspects of the first example embodiment, antenna ports of CSI-RS can be renumbered (e.g., by processor(s) 410 and/or processor(s) 510) prior to CSI calculation, wherein the renumbering of antenna ports can ensure that the same beam corresponding to different polarizations is transmitted (e.g., by communication circuitry 520) on the same resource element pair (CDM (Code Division Multiplexing) group), as mapped by processor(s) 510. In various such aspects, the antenna port renumbering (e.g., by processor(s) 410 and/or processor(s) 510) can be according to equation (1), above.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a UE (User Equipment), comprising: a memory interface; and processing circuitry configured to: process one or more configuration messages that comprise one or more configuration parameters for one or more CSI (Channel State Information)-RS (Reference Signal) APs (Antenna Ports) of a reduced density CSI-RS, wherein the one or more configuration parameters indicate a PRB (Physical Resource Block) decimation and a PRB offset; determine a set of REs (Resource Elements) for the one or more CSI-RS APs of the reduced density CSI-RS based on the one or more configuration parameters; measure the reduced density CSI-RS from the set of REs to determine one or more CSI parameters; and send the PRB decimation and the PRB offset to a memory via the memory interface.

Example 2 comprises the subject matter of any variation of any of example(s) 1, wherein the one or more configuration parameters comprises a single configuration parameter that indicates the PRB decimation and the PRB offset.

Example 3 comprises the subject matter of any variation of any of example(s) 1, wherein the one or more configuration parameters comprise the PRB decimation and the PRB offset.

Example 4 comprises the subject matter of any variation of any of example(s) 3, wherein the one or more configuration messages comprise a RRC (Radio Resource Control) message that comprises the PRB decimation and a DCI (Downlink Control Information) message that comprises the PRB offset.

Example 5 comprises the subject matter of any variation of any of example(s) 1-3, wherein the one or more configuration messages comprises a RRC (Radio Resource Control) message.

Example 6 comprises the subject matter of any variation of any of example(s) 1-3, wherein the one or more configuration messages comprises a DCI (Downlink Control Information) message.

Example 7 comprises the subject matter of any variation of any of example(s) 1-3, wherein the one or more CSI-RS APs comprise a single CSI-RS AP.

Example 8 comprises the subject matter of any variation of any of example(s) 1-3, wherein the one or more CSI-RS APs comprise two or more CSI-RS APs in a CSI-RS group.

Example 9 comprises the subject matter of any variation of any of example(s) 8, wherein the two or more CSI-RS APs in the CSI-RS group comprise a first half of configured CSI-RS APs for the UE or a second half of configured CSI-RS APs for the UE.

Example 10 comprises the subject matter of any variation of any of example(s) 1-3, wherein the one or more CSI-RS APs comprise each CSI-RS AP of a CSI-RS resource configuration.

Example 11 comprises the subject matter of any variation of any of example(s) 1-6, wherein the one or more CSI-RS APs comprise a single CSI-RS AP.

Example 12 comprises the subject matter of any variation of any of example(s) 1-6, wherein the one or more CSI-RS APs comprise two or more CSI-RS APs in a CSI-RS group.

Example 13 comprises the subject matter of any variation of any of example(s) 1-6, wherein the one or more CSI-RS APs comprise each CSI-RS AP of a CSI-RS resource configuration.

Example 14 is an apparatus configured to be employed in a gNB (next Generation Node B), comprising: a memory interface; and processing circuitry configured to: generate one or more configuration messages that comprise one or more configuration parameters for one or more CSI (Channel State Information)-RS (Reference Signal) APs (Antenna Ports) of a reduced density CSI-RS, wherein the one or more configuration parameters indicate a PRB (Physical Resource Block) decimation and a PRB offset; determine a set of REs (Resource Elements) for the one or more CSI-RS APs of the reduced density CSI-RS based on the one or more configuration parameters; map the reduced density CSI-RS for the one or more CSI-RS APs to the determined set of REs; and send the PRB decimation and the PRB offset to a memory via the memory interface.

Example 15 comprises the subject matter of any variation of any of example(s) 14, wherein the one or more configuration parameters comprises a single configuration parameter that indicates the PRB decimation and the PRB offset.

Example 16 comprises the subject matter of any variation of any of example(s) 14, wherein the one or more configuration parameters comprise the PRB decimation and the PRB offset.

Example 17 comprises the subject matter of any variation of any of example(s) 16, wherein the one or more configuration messages comprise a RRC (Radio Resource Control) message that comprises the PRB decimation and a DCI (Downlink Control Information) message that comprises the PRB offset.

Example 18 comprises the subject matter of any variation of any of example(s) 14-16, wherein the one or more configuration messages comprises a RRC (Radio Resource Control) message.

Example 19 comprises the subject matter of any variation of any of example(s) 14-16, wherein the one or more configuration messages comprises a DCI (Downlink Control Information) message.

Example 20 comprises the subject matter of any variation of any of example(s) 14-16, wherein the one or more CSI-RS APs comprise a single CSI-RS AP.

Example 21 comprises the subject matter of any variation of any of example(s) 14-16, wherein the one or more CSI-RS APs comprise two or more CSI-RS APs in a CSI-RS group.

Example 22 comprises the subject matter of any variation of any of example(s) 21, wherein the two or more CSI-RS APs in the CSI-RS group comprise a first half of configured CSI-RS APs for the UE or a second half of configured CSI-RS APs for the UE.

Example 23 comprises the subject matter of any variation of any of example(s) 14-16, wherein the one or more CSI-RS APs comprise each CSI-RS AP of a CSI-RS resource configuration.

Example 24 comprises the subject matter of any variation of any of example(s) 14-16, wherein the processing circuitry is further configured to map PDSCH (Physical Downlink Shared Channel) around the reduced density CSI-RS based on an assumption of a non-reduced density CSI-RS corresponding to the reduced density CSI-RS.

Example 25 comprises the subject matter of any variation of any of example(s) 14-16, wherein the processing circuitry is further configured to perform collision handling between the reduced density CSI-RS and at least one of paging messages or broadcast messages based on an assumption of a non-reduced density CSI-RS corresponding to the reduced density CSI-RS.

Example 26 comprises the subject matter of any variation of any of example(s) 14-16, wherein the processing circuitry is further configured to renumber the one or more CSI-RS APs such that the processing circuitry is configured to map the reduced density CSI-RS for each CSI-RS AP to a first RE of an associated RE pair of an associated CDM (Code Division Multiplexing) group and to map, to a second RE of the associated RE pair of the associated CDM group, the reduced density CSI-RS for an additional CSI-RS AP, wherein that CSI-RS AP and the additional CSI-RS AP are both associated with a common beam, wherein that CSI-RS is associated with a first polarization of the common beam and the additional CSI-RS AP is associated with a distinct second polarization of the common beam.

Example 27 comprises the subject matter of any variation of any of example(s) 14-17, wherein the processing circuitry is further configured to perform collision handling between the reduced density CSI-RS and at least one of paging messages or broadcast messages based on an assumption of a non-reduced density CSI-RS corresponding to the reduced density CSI-RS.

Example 28 comprises the subject matter of any variation of any of example(s) 14-18, wherein the processing circuitry is further configured to renumber the one or more CSI-RS APs such that the processing circuitry is configured to map the reduced density CSI-RS for each CSI-RS AP to a first RE of an associated RE pair of an associated CDM (Code Division Multiplexing) group and to map, to a second RE of the associated RE pair of the associated CDM group, the reduced density CSI-RS for an additional CSI-RS AP, wherein that CSI-RS AP and the additional CSI-RS AP are both associated with a common beam, wherein that CSI-RS is associated with a first polarization of the common beam and the additional CSI-RS AP is associated with a distinct second polarization of the common beam.

Example 29 is a machine readable medium comprising instructions that, when executed, cause a User Equipment (UE) to: receive one or more configuration messages that comprise one or more configuration parameters for one or more CSI (Channel State Information)-RS (Reference Signal) APs (Antenna Ports) of a reduced density CSI-RS, wherein the one or more configuration parameters indicate a PRB (Physical Resource Block) decimation and a PRB offset; determine a set of REs (Resource Elements) for the one or more CSI-RS APs of the reduced density CSI-RS based on the one or more configuration parameters; receive the reduced density CSI-RS from the set of REs; and measure the reduced density CSI-RS to determine one or more CSI parameters.

Example 30 comprises the subject matter of any variation of any of example(s) 29, wherein the one or more configuration parameters comprises a single configuration parameter that indicates the PRB decimation and the PRB offset.

Example 31 comprises the subject matter of any variation of any of example(s) 29, wherein the one or more configuration parameters comprise the PRB decimation and the PRB offset.

Example 32 is a machine readable medium comprising instructions that, when executed, cause a next Generation Node B (gNB) to: transmit one or more configuration messages that comprise one or more configuration parameters for one or more CSI (Channel State Information)-RS (Reference Signal) APs (Antenna Ports) of a reduced density CSI-RS, wherein the one or more configuration parameters indicate a PRB (Physical Resource Block) decimation and a PRB offset; determine a set of REs (Resource Elements) for the one or more CSI-RS APs of the reduced density CSI-RS based on the one or more configuration parameters; and transmit the reduced density CSI-RS for the one or more CSI-RS APs via the determined set of REs.

Example 33 comprises the subject matter of any variation of any of example(s) 32, wherein the one or more configuration parameters comprises a single configuration parameter that indicates the PRB decimation and the PRB offset.

Example 34 comprises the subject matter of any variation of any of example(s) 32, wherein the one or more configuration parameters comprise the PRB decimation and the PRB offset.

Example 35 comprises the subject matter of any variation of any of example(s) 32-34, wherein the instructions, when executed, further cause the gNB to: renumber the one or more CSI-RS APs; map the reduced density CSI-RS for each CSI-RS AP to a first RE of an associated RE pair of an associated CDM (Code Division Multiplexing) group and map, to a second RE of the associated RE pair of the associated CDM group, the reduced density CSI-RS for an additional CSI-RS AP, wherein that CSI-RS AP and the additional CSI-RS AP are both associated with a common beam, wherein that CSI-RS is associated with a first polarization of the common beam and the additional CSI-RS AP is associated with a distinct second polarization of the common beam.

Example 36 is an apparatus configured to be employed in a UE (User Equipment), comprising: means for receiving one or more configuration messages that comprise one or more configuration parameters for one or more CSI (Channel State Information)-RS (Reference Signal) APs (Antenna Ports) of a reduced density CSI-RS, wherein the one or more configuration parameters indicate a PRB (Physical Resource Block) decimation and a PRB offset; means for determining a set of REs (Resource Elements) for the one or more CSI-RS APs of the reduced density CSI-RS based on the one or more configuration parameters; means for receiving the reduced density CSI-RS from the set of REs; and means for measuring the reduced density CSI-RS to determine one or more CSI parameters.

Example 37 comprises the subject matter of any variation of any of example(s) 36, wherein the one or more configuration parameters comprises a single configuration parameter that indicates the PRB decimation and the PRB offset.

Example 38 comprises the subject matter of any variation of any of example(s) 36, wherein the one or more configuration parameters comprise the PRB decimation and the PRB offset.

Example 39 is an apparatus configured to be employed in a gNB (next Generation Node B), comprising: means for transmitting one or more configuration messages that comprise one or more configuration parameters for one or more CSI (Channel State Information)-RS (Reference Signal) APs (Antenna Ports) of a reduced density CSI-RS, wherein the one or more configuration parameters indicate a PRB (Physical Resource Block) decimation and a PRB offset; means for determining a set of REs (Resource Elements) for the one or more CSI-RS APs of the reduced density CSI-RS based on the one or more configuration parameters; and means for transmitting the reduced density CSI-RS for the one or more CSI-RS APs via the determined set of REs.

Example 40 comprises the subject matter of any variation of any of example(s) 39, wherein the one or more configuration parameters comprises a single configuration parameter that indicates the PRB decimation and the PRB offset.

Example 41 comprises the subject matter of any variation of any of example(s) 39, wherein the one or more configuration parameters comprise the PRB decimation and the PRB offset.

Example 42 comprises the subject matter of any variation of any of example(s) 39-41, further comprising: means for renumbering the one or more CSI-RS APs; means for mapping the reduced density CSI-RS for each CSI-RS AP to a first RE of an associated RE pair of an associated CDM (Code Division Multiplexing) group and mapping, to a second RE of the associated RE pair of the associated CDM group, the reduced density CSI-RS for an additional CSI-RS AP, wherein that CSI-RS AP and the additional CSI-RS AP are both associated with a common beam, wherein that CSI-RS is associated with a first polarization of the common beam and the additional CSI-RS AP is associated with a distinct second polarization of the common beam.

Example 43 comprises an apparatus comprising means for executing any of the described operations of examples 1-42.

Example 44 comprises a machine readable medium that stores instructions for execution by a processor to perform any of the described operations of examples 1-42.

Example 45 comprises an apparatus comprising: a memory interface; and processing circuitry configured to: perform any of the described operations of examples 1-42.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:
1. An apparatus configured to be employed for a UE (User Equipment), comprising:
   a memory interface; and
   processing circuitry coupled to the memory interface and configured to cause the UE to:
      receive a configuration message that comprises one or more configuration parameters for one or more CSI (Channel State Information)-RS (Reference Signal) APs (Antenna Ports) of a configurable density CSI-RS, the one or more configuration parameters indicating a density of CSI-RS resource per Physical Resource Block (PRB) per CSI-RS AP and a PRB offset;
      determine a set of REs (Resource Elements) for the one or more CSI-RS APs based on the one or more configuration parameters; and
      determine one or more CSI parameters based on measurements of the configurable density CSI-RS from the set of REs;

wherein the one or more configuration parameters are provided per CSI-RS resource configuration.

2. The apparatus of claim 1, wherein the PRB offset indicates one PRB offset on even PRBs or another PRB offset on odd PRBs, if the density of CSI-RS resource is ½ per PRB per CSI-RS AP.

3. The apparatus of claim 1, wherein the density of CSI-RS resource and the PRB offset are indicated separately by the one or more configuration parameters.

4. The apparatus of claim 1,
wherein the one or more CSI-RS APs comprise two or more CSI-RS APs in a CSI-RS group; and
wherein the two or more CSI-RS APs in the CSI-RS group comprise a first half of configured CSI-RS APs for the UE or a second half of configured CSI-RS APs for the UE.

5. The apparatus of claim 1, wherein the one or more CSI-RS APs comprise each CSI-RS AP of a CSI-RS resource configuration.

6. The apparatus of claim 1, wherein the PRB offset indicates an offset number of PRBs from a reference PRB.

7. An apparatus configured to be employed for a base station, comprising:
a memory interface; and
processing circuitry coupled to the memory interface and configured to:
generate a configuration message that comprises one or more configuration parameters for one or more CSI (Channel State Information)-RS (Reference Signal) APs (Antenna Ports) of a configurable density CSI-RS, wherein the one or more configuration parameters comprise indications of a density of CSI-RS resource per Physical Resource Block (PRB) per CSI-RS AP and a PRB offset;
determine a set of REs (Resource Elements) for the one or more CSI-RS APs of the configurable density CSI-RS based on the one or more configuration parameters; and
map the configurable density CSI-RS for the one or more CSI-RS APs to the determined set of REs;
wherein the one or more configuration parameters are provided per CSI-RS resource configuration.

8. The apparatus of claim 7, wherein the PRB offset indicates one PRB offset on even PRBs or another PRB offset on odd PRBs, if the density of CSI-RS resource is ½ per PRB per CSI-RS AP.

9. The apparatus of claim 7, wherein the configuration message is a RRC (Radio Resource Control) message.

10. The apparatus of claim 7, wherein the one or more CSI-RS APs comprise a single CSI-RS AP.

11. The apparatus of claim 7,
wherein the one or more CSI-RS APs comprise two or more CSI-RS APs in a CSI-RS group; and
wherein the two or more CSI-RS APs in the CSI-RS group comprise a first half of configured CSI-RS APs or a second half of configured CSI-RS APs.

12. The apparatus of claim 7, wherein the one or more CSI-RS APs comprise each CSI-RS AP of a CSI-RS resource configuration.

13. The apparatus of claim 7, wherein the processing circuitry is further configured to perform collision handling between the configurable density CSI-RS and at least one of paging messages or broadcast messages based on an assumption of a non-configurable density CSI-RS corresponding to the configurable density CSI-RS.

14. The apparatus of claim 7, wherein the processing circuitry is further configured to renumber the one or more CSI-RS APs such that the processing circuitry is configured to map the configurable density CSI-RS for one CSI-RS AP to a first RE of an associated RE pair of an associated CDM (Code Division Multiplexing) group and to map, to a second RE of the associated RE pair of the associated CDM group, the configurable density CSI-RS for an additional CSI-RS AP, wherein that CSI-RS AP and the additional CSI-RS AP are associated with a common beam, wherein that CSI-RS is associated with a first polarization of the common beam and the additional CSI-RS AP is associated with a distinct second polarization of the common beam.

15. The apparatus of claim 7, wherein the PRB offset indicates an offset number of PRBs from a reference PRB.

16. A non-transitory machine readable medium comprising instructions that, when executed, cause a User Equipment (UE) to:
receive a configuration message that comprises one or more configuration parameters for one or more CSI (Channel State Information)-RS (Reference Signal) APs (Antenna Ports) of a configurable density CSI-RS, wherein the configuration message comprises indications of a density of CSI-RS resource per Physical Resource Block (PRB) per CSI-RS AP and a PRB offset;
determine a set of REs (Resource Elements) for the one or more CSI-RS APs of the configurable density CSI-RS based on the one or more configuration parameters;
receive the configurable density CSI-RS from the set of REs; and
measure the configurable density CSI-RS to determine one or more CSI parameters;
wherein the one or more configuration parameters are provided per CSI-RS resource configuration.

17. The non-transitory machine readable medium of claim 16, wherein the PRB offset indicates one PRB offset on even PRBs or another PRB offset on odd PRBs, if the density of CSI-RS resource is ½ per PRB per CSI-RS AP.

18. A non-transitory machine readable medium comprising instructions that, when executed, cause a base station to:
transmit one or more configuration messages that comprise one or more configuration parameters for one or more CSI (Channel State Information)-RS (Reference Signal) APs (Antenna Ports) of a configurable density CSI-RS, wherein the one or more configuration parameters indicate a density of CSI-RS resource per Physical Resource Block (PRB) per CSI-RS AP and a PRB offset;
determine a set of REs (Resource Elements) for the one or more CSI-RS APs of the configurable density CSI-RS based on the one or more configuration parameters; and
transmit the configurable density CSI-RS for the one or more CSI-RS APs via the determined set of REs; and
wherein the one or more configuration parameters are provided per CSI-RS resource configuration.

19. The non-transitory machine readable medium of claim 18, wherein the PRB offset indicates one PRB offset on even PRBs or another PRB offset on odd PRBs, if the density of CSI-RS resource is ½ per PRB per CSI-RS AP.

20. The non-transitory machine readable medium of claim 18, wherein the density of CSI-RS resource and the PRB offset are indicated separately by the one or more configuration parameters.

* * * * *